United States Patent
Tokunaga

(10) Patent No.: US 7,191,768 B2
(45) Date of Patent: Mar. 20, 2007

(54) GAS FUEL FEED DEVICE

(75) Inventor: Motohisa Tokunaga, Fujisawa (JP)

(73) Assignee: Isuza Motors Limited, Tokyo (JP)

( * ) Notice: Subject to any disclaimer, the term of this patent is extended or adjusted under 35 U.S.C. 154(b) by 6 days.

(21) Appl. No.: 10/523,627

(22) PCT Filed: Aug. 8, 2003

(86) PCT No.: PCT/JP03/10133

§ 371 (c)(1),
(2), (4) Date: Feb. 4, 2005

(87) PCT Pub. No.: WO2004/015262

PCT Pub. Date: Feb. 19, 2004

(65) Prior Publication Data

US 2006/0054144 A1 Mar. 16, 2006

(30) Foreign Application Priority Data

Aug. 9, 2002 (JP) .............................. 2002-232514

(51) Int. Cl.
*F02B 43/00* (2006.01)
*F16K 31/12* (2006.01)
(52) U.S. Cl. ............. 123/527; 137/505.12; 137/505.14
(58) Field of Classification Search ........ 123/525–527; 137/505.12, 505.14
See application file for complete search history.

(56) References Cited

U.S. PATENT DOCUMENTS 5,735,248 A * 4/1998 Matsuura et al. ........... 123/527
2001/0032628 A1 10/2001 Goto et al. ................. 123/529

FOREIGN PATENT DOCUMENTS

| JP | 60-047860 | 3/1985 |
|----|-----------|--------|
| JP | 60-140044 | 7/1985 |
| JP | 60-60182544 | 7/1985 |
| JP | 07-279772 | 10/1995 |
| JP | 11-304029 | 11/1999 |
| JP | 2000-274324 | 10/2000 |
| JP | 2000-337208 | 12/2000 |

* cited by examiner

*Primary Examiner*—Noah P. Kamen
(74) *Attorney, Agent, or Firm*—McCormick, Paulding & Huber LLP

(57) ABSTRACT

It is an object of this invention to provide a gas fuel supply system in which a controllable range in the fuel injection quantity control by an injector is enlarged. According to one preferable aspect of this invention, the gas fuel supply system comprises an injector provided in an intake pipe of an internal combustion engine, a fuel supply passage for supplying the gas fuel to the injector, and means for controlling pressure of the gas fuel supplied to the injector through the fuel supply passage by using negative pressure in the intake pipe such that the pressure of the gas fuel increases if the negative pressure in the intake pipe decreases, and the pressure of the gas fuel decreases if the negative pressure in the intake pipe increases.

5 Claims, 4 Drawing Sheets

GAS FUEL FEED DEVICE

CROSS-REFERENCE TO RELATED APPLICATIONS

This application is entitled to the benefit of and incorporates by reference essential subject matter disclosed in International Patent Application No. PCT/JP2003/010133 filed on Aug. 8, 2003 and Japanese Patent Application No. 2002-232514 filed on Aug. 9, 2002.

BACKGROUND OF THE INVENTION

1. Technical Field

This invention relates to a gas fuel supply system for supplying gas fuel to an internal combustion engine in which the gas fuel such as compressed natural gas burns.

2. Background Art

In recent years, gas fuel such as natural gas is adopted as one of the alternative fuels to gasoline or light oil. In case that the gas fuel is applied for the internal combustion engine of a vehicle, as disclosed in JP 2000-337208A, such a gas fuel supply system is known for example that a high-pressure cylinder (fuel tank) filled up with the compressed natural gas is mounted on the vehicle, and the gas fuel supplied from the high-pressure cylinder is decompressed with a regulator and then injected into an intake pipe of the internal combustion engine by an injector.

A conventional gas fuel supply system will now be described with reference to FIG. 6.

As shown in the figure, a regulator 61 for decompressing and regulating the pressure of the gas fuel is connected to a high-pressure fuel supply passage 60 connected to a fuel tank (not shown). A low-pressure fuel supply passage 62 is connected to an outlet side of the regulator 61, and the low-pressure fuel supply passage 62 is connected to an injector 64 provided in an intake pipe 63 of the engine.

The regulator 61 is a two-stage type regulator which comprises a primary regulator (high-pressure regulator) 65a and a secondary regulator (low-pressure regulator) 65b.

However, a single stage type regulator may be used if, for example, the gas fuel pressure is relatively low.

A throttle valve 66 is provided in the intake pipe 63. The throttle valve 66 opens and closes the intake pipe 63 according to an accelerator opening degree of the vehicle to adjust an amount of intake air. The injector 64 is provided at a downstream side of the throttle valve 66, i.e., a combustion chamber side of the engine, in the intake pipe 63.

The gas fuel is compressed to approximately 20 MPa (≈200 kgf/cm2) for example, and is put into the fuel tank. The fuel supplied to the high-pressure fuel supply passage 60 from the fuel tank is decompressed to approximately 390 kPa (≈3.9 kgf/cm2) by the high-pressure regulator 65a. Subsequently, the fuel is decompressed and regulated to approximately 30 kPa (≈0.3 kgf/cm2) by the low-pressure regulator 65b, and then supplied to the injector 64 through the low-pressure fuel supply passage 62.

In the meantime the high pressure and the low-pressure regulators 65a and 65b comprises valve elements 68a and 68b movable upwardly and downwardly to open and close passing holes 67a and 67b for the gas fuel, and diaphragms 69a and 69b to which the valve elements 68a and 68b are connected. Insides of the regulators 65a and 65b are divided into decompression chambers 70a and 70b and diaphragm chambers 71a and 71b. The decompression chambers 70a and 70b are defined in front sides of the diaphragms 69a and 69b and receive the gas fuel passing through the passing holes 67a and 67b. The diaphragm chambers 71a and 71b are defined in back sides of the diaphragms 69a and 69b. Adjustment springs 72a and 72b are provided in the diaphragm chambers 71a and 71b. The adjustment springs 72a and 72b are disposed in approximate central parts of the diaphragms 69a and 69b. The adjustment springs 72a and 72b urge the diaphragms 69a and 69b in such directions that the valve elements 68a and 68b open the passing holes 67a and 67b (downwardly in the figure).

The diaphragm chambers 71a and 71b are released to the atmosphere, and the pressure in the diaphragm chambers 71a and 71b is atmospheric pressure (approximately 0.1 MPa≈1 kgf/cm2). The gas fuel from the fuel tank flows into the decompression chambers 70a and 70b through the inlet holes 67a and 67b. When the gas fuel flows into the decompression chambers 70a and 70b, the pressure in the decompression chambers 70a and 70b rises. When the pressure in the decompression chambers 70a and 70b reaches a predetermined set pressure, the pressure in the decompression chambers 70a and 70b becomes greater than the resultant force of the pressure in the diaphragm chambers 71a and 71b (atmospheric pressure) and the urging force of the adjustment springs 72a and 72b. Accordingly, the diaphragms 69a and 69b and the valve elements 68a and 68b are pushed up and the inlet holes 67a and 67b are closed. When the gas fuel in the decompression chambers 70a and 70b flows out and the pressure in the decompression chambers 70a and 70b falls, the resultant force of the pressure in the diaphragm chambers 71a and 71b and the urging force of the adjustment springs 72a and 72b becomes greater than the pressure in the decompression chambers 70a and 70b. Accordingly, the valve elements 68a and 68b are pushed down and the inlet holes 67a and 67b are opened. As a result, the pressure of the gas fuel that is in and out of the decompression chambers 70a and 70b is kept almost constant.

That is, the pressure of the gas fuel flowing out of the regulators 65a and 65b is determined by a balance between a force for opening the inlet holes 67a and 67b (a force for pushing the diaphragms 69a and 69b and the valve elements 68a and 68b down) which is caused by a resultant of the pressure in the diaphragm chambers 71a and 71b (atmospheric pressure) and the urging force of the adjustment springs 72a and 72b, and a force for closing the inlet holes 67a and 67b (a force for pushing the diaphragms 69a and 69b and the valve elements 68a and 68b up) which is caused by the pressure of the gas fuel in the decompression chambers 70a and 70b.

Therefore, the pressure of the fuel supplied to the injector 64 through the regulator 61 (injector source pressure) always becomes almost constant. Accordingly, an increase and decrease control of the fuel injection quantity is performed by the injector 64 in accordance with variation of a running condition of the vehicle (e.g., opening and closing of the throttle valve 66).

However, there has been a problem that, if the injector source pressure is always constant, a controllable range of the increase and decrease control of the fuel injection quantity becomes narrow and thus it becomes impossible to cope with an engine having a wide power range, since the minimum injection quantity and the maximum injection quantity of the fuel is determined by the performance of the injector 64. That is, if such an injector is adopted that has a superior controllability in an idle region where the fuel injection quantity is small, the maximum injection quantity of the fuel may lack. If such an injector is adopted that has a superior controllability in a high power region where the fuel injection quantity is large, the fuel injection quantity at the time of idling may become excessive and an idling speed may not be controlled.

In particular, the maximum fuel injection quantity of the fuel depends on the injector source pressure, and thus is limited if a control by the injector only is performed.

SUMMARY OF THE INVENTION

It is an object of this invention to solve the problem above-mentioned, and to enlarge a controllable range of the fuel injection quantity control by the injector in a gas fuel supply system.

In order to attain the above object, this invention is a gas fuel supply system for supplying gas fuel to an internal combustion engine, comprising: an injector provided in an intake pipe of the internal combustion engine; a fuel supply passage for supplying the gas fuel to the injector; and means for controlling pressure of the gas fuel supplied to the injector through the fuel supply passage by using negative pressure in the intake pipe such that the pressure of the gas fuel increases if the negative pressure in the intake pipe decreases, and the pressure of the gas fuel decreases if the negative pressure in the intake pipe increases.

Here, the means for controlling the pressure of the gas fuel may comprise a diaphragm type regulator provided in the fuel supply passage, and a negative pressure supplying passage which connects a diaphragm chamber of the regulator to the intake pipe.

Furthermore, a throttle valve may be provided in the intake pipe for adjusting an amount of intake air, and the negative pressure supplying passage may connect the diaphragm chamber to a downstream side of the throttle valve in the intake pipe.

Moreover, the regulator may be a two stages type regulator comprising a high-pressure regulator and a low-pressure regulator, and the negative pressure supplying passage may connect respective diaphragm chambers of the high-pressure regulator and the low-pressure regulator to the intake pipe.

Furthermore, this invention is a gas fuel supply system comprising: a regulator for decompressing gas fuel and supplying the decompressed gas fuel to an injector provided in an intake pipe of an internal combustion engine; and a throttle valve provided in an upstream side of the injector in the intake pipe, wherein the regulator comprises a valve element for opening and closing a passing hole for the gas fuel, a diaphragm to which the valve element is connected, a decompression chamber defined in a front side of the diaphragm for receiving the gas fuel which passes the passing hole, a diaphragm chamber defined in a back side of the diaphragm, and an adjustment spring for urging the diaphragm in such a direction that the valve element opens the passing hole, wherein pressure in the diaphragm chamber acts to move the valve element in an opening direction, and pressure of the decompression chamber acts to move the valve element in a closing direction, wherein the diaphragm chamber of the regulator is connected to a downstream side of the throttle valve in the intake pipe.

Other objects, constitutions, operations and effects of this invention will become apparent for the person skilled in the art once a following detailed description of this invention is read and understood.

DETAILED DESCRIPTION OF THE PREFERRED EMBODIMENTS

One preferable embodiment of this invention will now be described in detail with reference to accompanying drawings.

Figure 1:
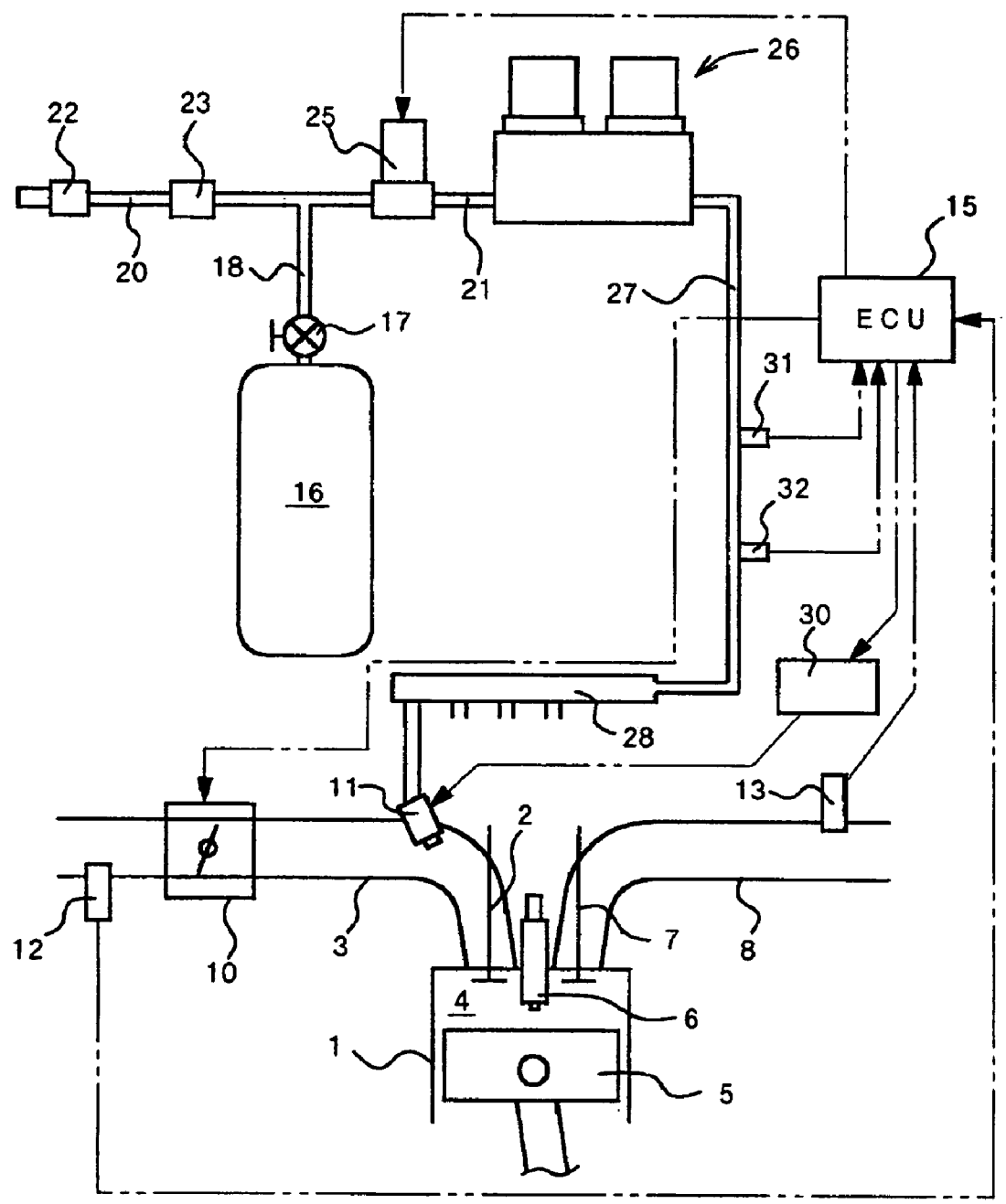
FIG. 1 is a schematic diagram of a gas fuel supply system as a whole according to one embodiment of this invention.

Initially, a gas fuel supply system as a whole of this embodiment will generally be described with reference to FIG. 1.

In a gas fuel powered internal combustion engine (simply referred to as an engine hereinafter) of this embodiment, intake air (fuel-air mixture) is sucked into a combustion chamber 4 from an intake pipe 3 when an intake valve 2 of each cylinder 1 is opened. The intake air is then compressed by a piston 5, and ignited by a spark plug 6 to burn. When an exhaust valve 7 is opened, exhaust gas is discharged to an exhaust pipe 8. These processes are repeated continuously.

The intake pipe 3 is provided with a throttle valve 10 and an injector 11. The throttle valve 10 is interlocked with the accelerator opening degree of the vehicle and opens and closes the intake pipe 3 to adjust the amount of the intake air. The injector 11 is disposed in a downstream side of the throttle valve 10 (combustion chamber 4 side) and injects the gas fuel into the intake pipe 3. An opening and closing control of the throttle valve 10 is carried out by the signal from the electronic control unit (ECU) 15 of the vehicle. An air flow meter 12 for detecting an amount of the intake air is provided in an upstream side of the throttle valve 10 in the intake pipe 3. An O2 sensor 13 for detecting an amount of oxygen in the exhaust gas is provided in the exhaust pipe 8. Detection values of the air flow meter 12 and the O2 sensor 13 are transmitted to the ECU 15.

Numeral 16 in the figure shows a fuel tank which is filled up with the gas fuel (CNG for example). A fuel filling passage 20 and a high-pressure fuel supply passage 21 are connected to the fuel tank 16 via the piping 18 in which the manual valve 17 is interposed.

The fuel filling passage 20 is provided with a filling inlet 22 for filling the fuel tank 16 with the gas fuel, and a check valve 23 for preventing a reverse flow of the gas fuel to the filling inlet 22 from the fuel tank 16.

The high-pressure fuel supply passage 21 is provided with a fuel shut-off valve 25 which is controlled to open and close by the ECU 15, and a regulator (pressure regulator) 26 which decompresses the gas fuel from the fuel tank 16 to regulate its pressure. A low-pressure fuel supply passage 27 is connected to a downstream side of the regulator 26. The low-pressure fuel supply passage 27 is connected to the injector 11 of each cylinder 1 of the engine via a fuel gallery 28.

The fuel shut-off valve 25 is closed when the engine stops, and it prevents that the gas fuel leaks from the fuel tank 16.

During operation of the engine, the fuel shut-off valve 25 is opened, and the gas fuel in the fuel tank 16 is supplied to the regulator 26 via the high-pressure fuel supply passage 21, and is decompressed and regulated. Then, the gas fuel goes through the low-pressure fuel supply passage. 27, and is distributed and supplied to the injector 11 of each cylinder 1 via the fuel gallery 28 to be injected into the intake pipe 3.

The injector 11 is connected to an injector drive unit 30, and the fuel injection quantity and the fuel injection timing are controlled by the injector drive unit 30. The injector drive unit 30 is connected to the ECU 15 and controls the injector 11 according to an output signal from the ECU 15.

The low-pressure fuel supply passage 27 is provided with a temperature sensor 31 which detects temperature of the gas fuel supplied to the injector 11, and a pressure sensor 32 which detects pressure in the low-pressure fuel supply passage 27. Detection values of the temperature sensor 31 and the pressure sensor 32 are transmitted to the ECU 15.

Now, a point of this invention lies in providing means for controlling pressure of the gas fuel supplied to the injector 11 from the low-pressure fuel supply passage 2 such that the pressure of the gas fuel increases if negative pressure in the intake pipe 3 decreases, and the pressure of the gas fuel decreases if the negative pressure in the intake pipe 3 increases, using the negative pressure in the intake pipe 3, in order to expand a controllable range of the increase and decrease control of the gas fuel injection quantity by the injector 11.

Figure 2:
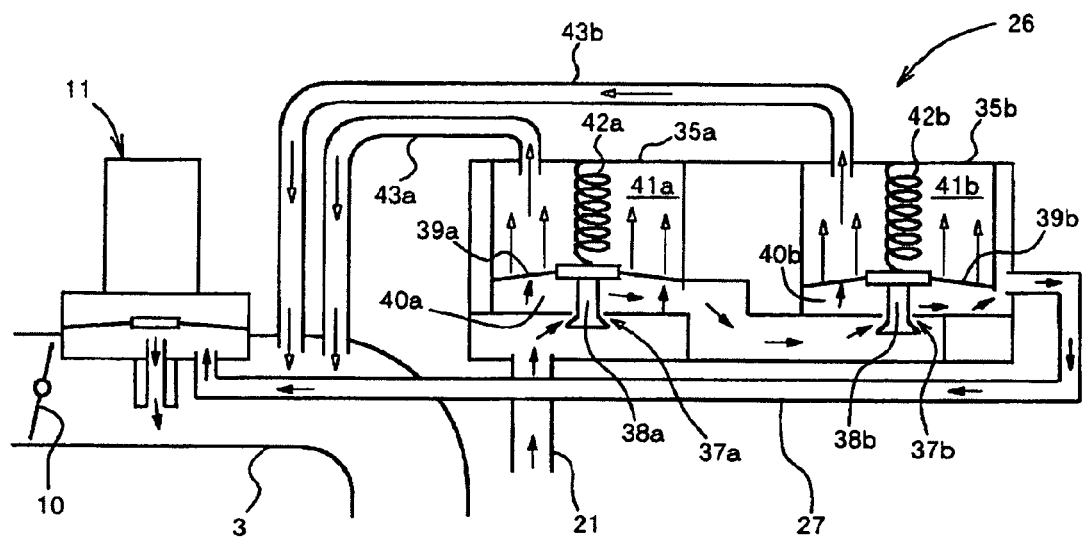
FIG. 2 is a diagram of a main part of the gas fuel supply system according to one embodiment of this invention, showing a state when an engine idles.
Figure 3:
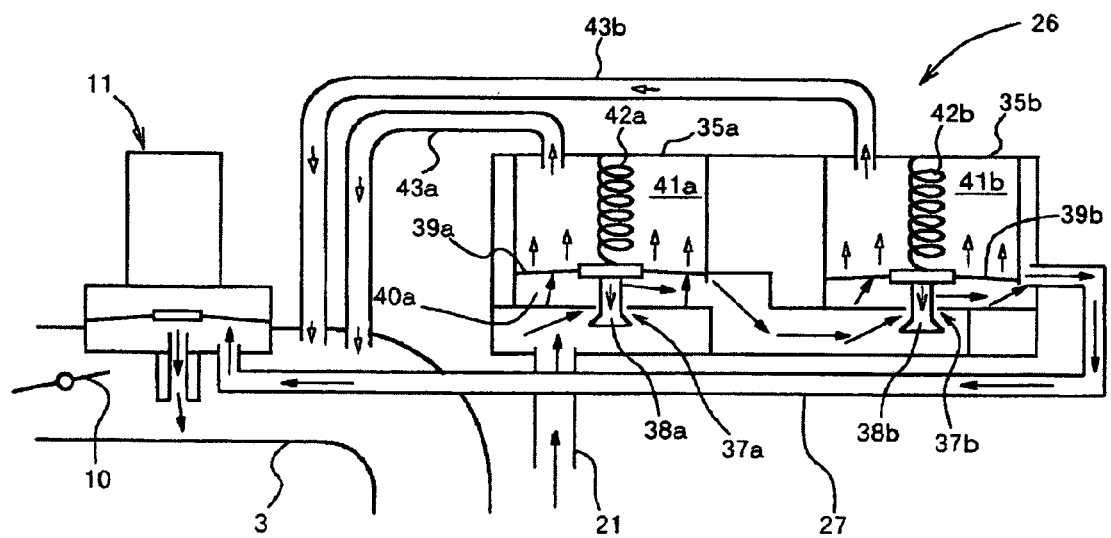
FIG. 3 is a diagram of the main part of the gas fuel supply system according to one embodiment of this invention, showing a state when the engine operates in a full load region.

Accordingly, the regulator 26 and the injector 11 which are the main part of this embodiment are described hereafter using FIGS. 2 and 3.

FIG. 2 shows a state when the engine idles, and FIG. 3 shows a state when the engine operates in a full load region.

As shown in Figs., the regulator 26 is connected to the high-pressure fuel supply passage 21 connected to the fuel tank (not shown), and the outlet side of the regulator 26 is connected to the injector 11 via the low-pressure fuel supply passage 27.

In this embodiment, the regulator 26 is a two-stage type regulator which comprises a primary regulator (high-pressure regulator) 35a and a secondary regulator (low-pressure regulator) 35b. However, if gas fuel with relatively low pressure is applied, a one-stage type regulator may be adopted.

As described above, the injector 11 is provided in the intake pipe 3 at a downstream side of the throttle valve 10 which adjusts the amount of intake air.

The gas fuel is compressed to, for example, approximately 20 MPa (≈200 kgf/cm2), and is put into the fuel tank. The gas fuel supplied to the high-pressure fuel supply passage 21 from the fuel tank is decompressed to a first pressure by the high-pressure regulator 35a, and subsequently is decompressed and regulated to a second pressure lower than the first pressure by the low-pressure regulator 35b, and then supplied to the injector 11 through the low-pressure fuel supply passage 27 to be injected into the intake pipe 3.

The high pressure regulator 35a and the low-pressure regulator 35b comprise valve elements 38a and 38b movable upwardly and downwardly to open and close passing holes 37a and 37b for the gas fuel, and diaphragms 39a and 39b to approximate centers of which the valve elements 38a and 38b are connected. Insides of the regulators 35a and 35b are divided into decompression chambers 40a and 40b and diaphragm chambers 41a and 41b. The decompression chambers 40a and 40b are defined at front sides (lower sides in the figure) of the diaphragms 39a and 39b. The diaphragm chambers 41a and 41b are defined at back sides of the diaphragms 39a and 39b. The gas fuel which passes the passing holes 37a and 37b is introduced into the decompression chambers 40a and 40b.

The adjustment springs 42a and 42b are provided in the diaphragm chambers 41a and 41b, and are attached to approximate central portions of the diaphragms 39a and 39b. The adjustment springs 42a and 42b urge the diaphragms 39a and 39b in such directions that the valve elements 38a and 38b open the inlet holes 37a and 37b (downwardly in the figure).

The valve elements 38a and 38b have poppet-like shapes, and are formed into taper shapes so that their outer diameter becomes larger as they go lower.

It should be noted that the diaphragm chambers 41a and 41b are connected to the intake pipe 3 at downstream side of the throttle valve 10 by negative pressure supplying passages 43a and 43. Therefore, the negative pressure in the intake pipe 3 is supplied to the diaphragm chambers 41a and 41b, and the pressure in the diaphragm chambers 41a and 41b varies according to variation (increase and decrease) of the negative pressure in the intake pipe 3.

The gas fuel flows into the decompression chambers 40a and 40b through the inlet holes 37a and 37b. When the gas fuel flows into the decompression chambers 40a and 40b, the pressure in the decompression chambers 40a and 40b rises. When the pressure becomes greater than the resultant force of the pressure in the diaphragm chambers 41a and 41b and the urging force of the adjustment springs 42a and 42b, the diaphragms 39a and 39b and the valve elements 38a and 38b are pushed up and the inlet holes 37a and 37b are closed. When the gas fuel in the decompression chambers 40a and 40b flows out and the pressure in the decompression chambers 40a and 40b falls into a value which is less than the resultant force of the pressure in the diaphragm chambers 41a and 41b and the urging force of the adjustment springs 42a and 42b, the diaphragms 39a and 39b and the valve elements 68a and 68b are pushed down and the inlet holes 37a and 37b are opened.

That is, the pressure in the diaphragm chambers 41a and 41b (positive pressure) and the urging force of the adjustment springs 42a and 42b act to move the valve elements 38a and 38b in opening directions, and the pressure in the decompression chambers 40a and 40b acts to move the valve elements 38a and 38b in closing directions. And then, the pressure of the gas fuel flowing out of the respective regulators 35a and 35b is determined by a balance between force for moving the valve elements 38a and 38b in the opening directions (force for pushing the diaphragms 39a and 39b and the valve elements 38a and 38b down) which is caused by a resultant of the pressure in the diaphragm chambers 41a and 41b and the urging forces of the adjustment springs 42a and 42b, and force for moving the valve elements 38a and 38b in the closing directions (force for pushing the diaphragms 39a and 39b and the valve elements 38a and 38b up) which is caused by the pressure of the gas fuel in the decompression chambers 40a and 40b.

Therefore, the pressure of the gas fuel supplied to the injector 11 from the regulator 62 (an injector source pressure) changes when the pressure in the diaphragm chambers

41a and 41b changes in accordance with change of the negative pressure in the intake pipe 3.

Next, an operation of this embodiment will be described. In the figure, black arrows show flow of the gas fuel, and white arrows show flow of the air.

Firstly, as shown in FIG. 2, when the engine is in the idling state, the throttle valve 10 is approximately completely closed. Therefore, the negative pressure at the downstream side of the throttle valve 10 in the intake pipe 3 becomes large. When this negative pressure is supplied to the diaphragm chambers 41a and 41b of the regulators 35a and 35b via the negative pressure supplying passages 43a and 43b, the pressure in the diaphragm chambers 41a and 41b decrease. Consequently, the force for moving the valve elements 38a and 38b in the opening direction becomes small, and the pressure of the gas fuel being out of the regulators 35a and 35b becomes small. Therefore, the pressure of the gas fuel supplied to the injector 11 through the regulator 26 (the injector source pressure) becomes low. Naturally, flow rate of the gas fuel supplied to the injector 11 also becomes small.

Figure 6:
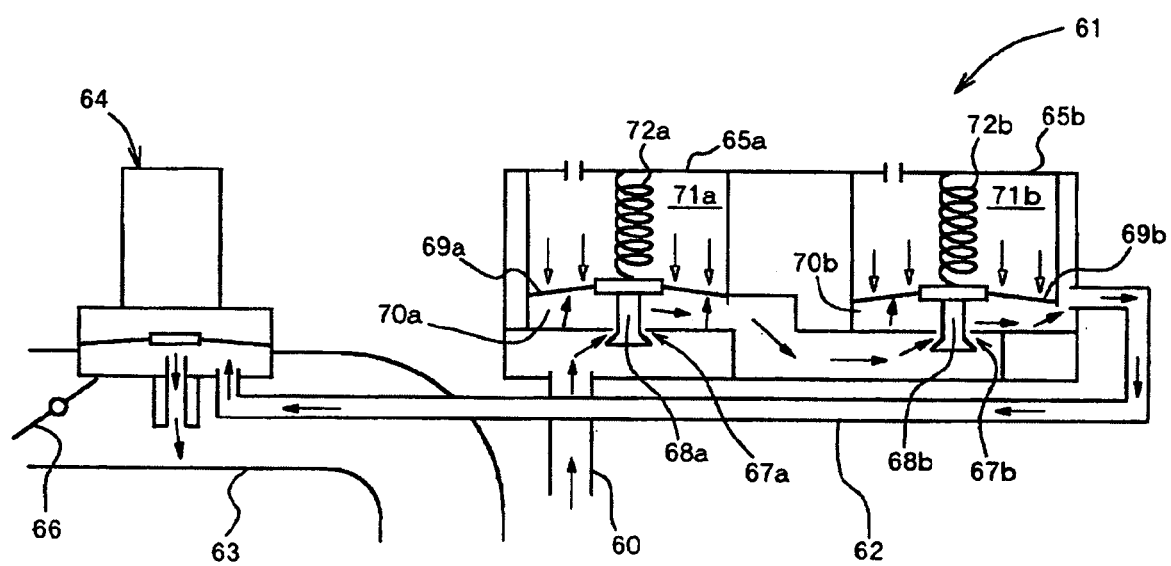
FIG. 6 is a diagram of a conventional gas fuel supply system.

The injector 11 will perform the increase and decrease control of the fuel injection quantity to the gas fuel having such a low pressure (small flow rate). On an assumption that the performance of the injector 11 is constant, the minimum injection quantity can be smaller as the injector source pressure is lower. Therefore, as compared with the conventional gas fuel supply system as shown in FIG. 6, the minimum fuel injection quantity which is controllable by the injector can become smaller. Therefore, it can be prevented that the fuel injection quantity becomes excessive when the engine idles. And also, it becomes possible to accurately control the fuel injection quantity in the idling region of the engine since the injector source pressure is low.

On the other hand, as shown in FIG. 3, the throttle valve 10 is approximately completely opened when the engine operates in the full load region. Therefore, the negative pressure at the downstream side of the throttle valve 10 in the intake pipe 3 becomes small. Therefore, the negative pressure which is supplied to the diaphragm chambers 41a and 41b of the regulators 35a and 35b via the negative pressure supplying passages 43a and 43b becomes small, and the pressure in the diaphragm chambers 41a and 41b becomes large compared with the case that the engine idles as shown in FIG. 2. Consequently, the force for moving the valve elements 38a and 38b in the closing direction becomes large, and the pressure of the gas fuel supplied to the injector 11 through the regulator 26 becomes higher compared with the time of idling. Naturally, the flow rate of the gas fuel supplied to the injector 11 also becomes large.

The injector 11 will perform the increase and decrease control of the fuel injection quantity to the gas fuel having such a high pressure (large flow rate). On an assumption that the performance of the injector 11 is constant, the maximum injection quantity can be larger as the injector source pressure is higher. Therefore, compared with the conventional gas fuel supply system, the maximum fuel injection quantity which is controllable by the injector can become larger. Therefore, it can be prevented that the fuel injection quantity lacks when the engine operates in the full load region.

In short, the pressure in the diaphragm chambers 41a and 41b of the regulator 26 is controlled such that the injector source pressure becomes small in the low power region in which the negative pressure in the intake pipe 3 becomes large, and the injector source pressure becomes large in the high power region in which the negative pressure in the intake pipe 3 becomes small. Moreover, the negative pressure in the intake pipe 3 is used for the control.

Therefore, the increase and decrease control of the fuel injection quantity by the injector 11 can be performed by the injector source pressure control plus the fuel injection quantity control by the injector 11 itself. That is, according to the gas fuel supply system of this embodiment, the minimum fuel injection quantity when the engine is in the idle state becomes a value of a minimum injection quantity of the injector to the minimum injector source pressure, and the maximum fuel injection quantity when the engine is in the full load state becomes a value of a maximum injection quantity of the injector to the maximum injector source pressure. Therefore, compared with the conventional gas fuel supply system, a controllable range in the fuel injection quantity control becomes wider, and it can be applied to an engine which has, for example, a wide power range.

Since the gas fuel with an appropriate pressure to the fuel injection quantity is supplied to the injector 11 in all power range of the engine, it becomes possible to conduct an accurate fuel injection quantity control in all power range of the engine.

Since the gas fuel supply system of this embodiment can be manufactured only by attaching the negative pressure supplying passages 43a and 43b to the conventional gas fuel supply system shown in FIG. 6, the system can be easily manufactured, diverting the existing device.

Although the diaphragm chambers 41a and 41b of both the high-pressure regulator 35a and the low-pressure regulator 35b of the regulator 26 are separately connected to the intake pipe 3 in this embodiment, the diaphragm chambers 41a and 41b of both the regulators 35a and 35b may be gathered to one negative pressure supplying passage to be connected to the intake pipe 3. The diaphragm chamber 41b of the low-pressure regulator 35b only may be connected to the intake pipe 3.

Next, another embodiment will be described with reference to FIGS. 4 and 5. For the same elements as the embodiment shown in FIGS. 2 and 3, the same reference numbers are provided and a detailed description is omitted.

In this embodiment, the regulator 45 (which may be a two stage type or a one stage type) is the same as the regulator 61 of the conventional gas fuel supply system shown in FIG. 6. That is, the diaphragm chamber of the regulator 45 of this embodiment is released to the atmosphere, and the pressure of the gas fuel which comes out of the regulator 45 to the low-pressure fuel supply passage 27 is always constant.

In this embodiment, a flow rate control valve 46 is interposed between the regulator 45 and the injector 11.

The flow rate control valve 46 comprises a valve element 48, a negative pressure receiving part 50, a negative pressure applied chamber 51 and an adjustment spring 52. The valve element 48 is movable upwardly and downwardly to open and close a passing hole 47 for the gas fuel. The negative pressure receiving part 50 is connected to the valve element 48 via a spring 49. The negative pressure applied chamber 51 contains the negative pressure receiving part 50. The adjustment spring 52 urges the valve element 48 in a closing direction (upwardly in the figures). An upper end of the negative pressure applied chamber 51. is connected to the intake pipe 3 at a downstream side of the throttle valve 10 via the negative pressure supplying passage 53. Therefore, the negative pressure in the intake pipe 3 acts on the negative pressure applied chamber 51.

Pressure (positive pressure) in a space located in an upper side of the negative pressure receiving part 50, i.e., a space located in a side connected to the negative pressure supplying passage 53, in the negative pressure applied chamber 51, and pressure of the gas fuel flowing to the passing hole 47 from the regulator 45 acts on the valve element 48 to move the valve element 48 in an opening direction. That is, they act on the valve element 48 such that the valve element 48 is pushed down.

On the other hand, an urging force of the adjustment spring 52 acts on the valve element 48 to move the valve element 48 in a closing direction. That is, it acts on the valve element 48 such that the valve element 48 is pushed up.

Figure 4:
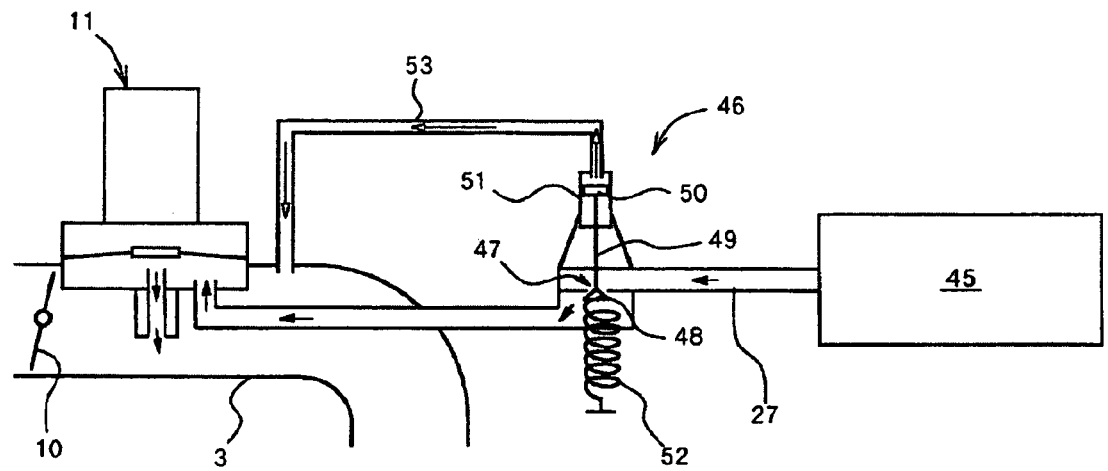
FIG. 4 is a diagram of the main part of the gas fuel supply system according to another embodiment of this invention, showing a state when the engine idles.

When the engine is in the idling state, as shown in FIG. 4, large negative pressure generated in the downstream side of the throttle valve 10 in the intake pipe 3 acts on the negative pressure applied chamber 51 of the flow rate control valve 46, and the pressure in the space located in the upper side of the negative pressure receiving part 50 in the negative pressure applied chamber 51 decreases. Consequently, the force for moving the valve element 48 in the opening direction becomes small, the valve element 48 is pulled up, and the pressure of the gas fuel supplied to the injector 11 from the flow rate control valve 46 becomes low.

Figure 5:
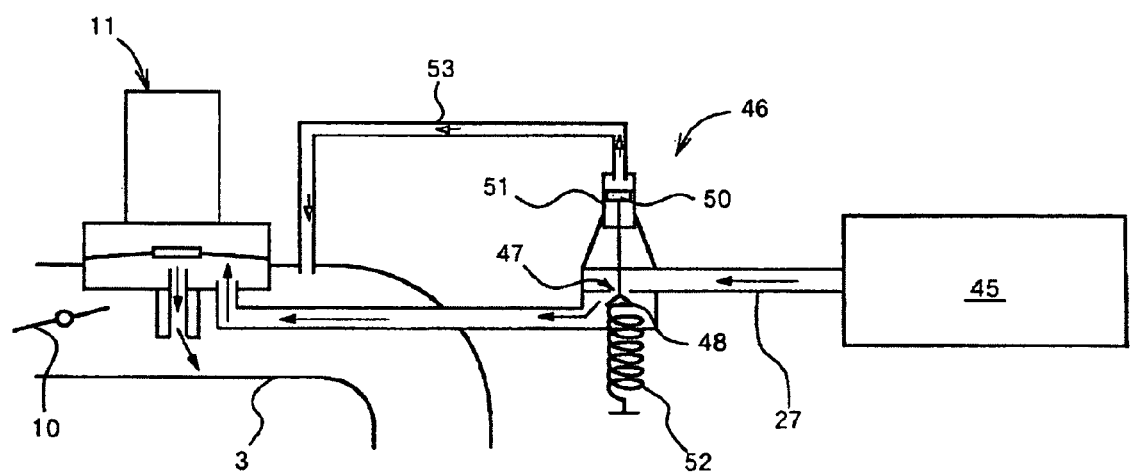
FIG. 5 is a diagram of the main part of the gas fuel supply system according to another embodiment of this invention, showing a state when the engine operates in the full load region.

On the other hand, when the engine is in the full load state, as shown in FIG. 5, the negative pressure applied to the negative pressure applied chamber 50 becomes small, and the pressure in the space located in the upper side of the negative pressure receiving part 50 becomes larger compared with the case that the engine is in the idle state. Consequently, the force for moving the valve element 48 in the opening direction becomes large, and the pressure of the gas fuel supplied to the injector 11 from the flow rate control valve 46 becomes higher compared with the case that the engine is in the idle state.

Thus, also in this embodiment, the injector source pressure becomes low in the low power region where the negative pressure in the intake pipe 3 becomes large, and the injector source pressure becomes high in the high power region where the negative pressure in the intake pipe 3 becomes small.

Therefore, the controllable range in the fuel injection quantity control by the injector 11 can be wider.

In short, according to this invention, an outstanding effect that the controllable range in the fuel injection quantity control by the injector can be wider is demonstrated.

The invention claimed is:

1. A gas fuel supply system for supplying gas fuel to an internal combustion engine, comprising:
    a fuel supply passage for supplying the gas fuel to an injector; and
    source pressure control means for controlling pressure of the gas fuel supplied to the injector through the fuel supply passage by using negative pressure in an intake pipe such that the pressure of the gas fuel increases if the negative pressure in the intake pipe decreases, and the pressure of the gas fuel decreases if the negative pressure in the intake pipe increases;
    wherein the source pressure control means comprises a diaphragm type regulator provided in the fuel supply passage, and a negative pressure supplying passage which connects a diaphragm chamber of the regulator to the intake pipe;
    wherein a throttle valve is provided in the intake pipe for adjusting an amount of intake air, and the negative pressure supplying passage connects the diaphragm chamber of the regulator to a downstream side of the throttle valve in the intake pipe; and
    wherein the regulator is a two-stage type regulator comprising a high-pressure regulator and a low-pressure regulator disposed at a downstream side of the high-pressure regulator, and the negative pressure supplying passage connects respective diaphragm chambers of the high-pressure regulator and the low-pressure regulator to the intake pipe.

2. A gas fuel supply system for supplying gas fuel to an internal combustion engine, comprising:
    a fuel supply passage for supplying the gas fuel to an injector; and
    source pressure control means for controlling pressure of the gas fuel supplied to the injector through the fuel supply passage by using negative pressure in an intake pipe such that the pressure of the gas fuel increases if the negative pressure in the intake pipe decreases, and the pressure of the gas fuel decreases if the negative pressure in the intake pipe increases;
    wherein the source pressure control means comprises a diaphragm type regulator provided in the fuel supply passage, and a negative pressure supplying passage which connects a diaphragm chamber of the regulator to the intake pipe;
    wherein a throttle valve is provided in the intake pipe for adjusting an amount of intake air, and the negative pressure supplying passage connects the diaphragm chamber of the regulator to a downstream side of the throttle valve in the intake pipe; and
    wherein the regulator is a two-stage type regulator comprising a high-pressure regulator and a low-pressure regulator disposed at a downstream side of the high-pressure regulator, and the negative pressure supplying passage connects a diaphragm chamber of the low-pressure regulator to the intake pipe.

3. A gas fuel supply system for supplying gas fuel to an internal combustion engine, comprising:
    a fuel supply passage for supplying the gas fuel to an injector; and
    source pressure control means for controlling pressure of the gas fuel supplied to the injector through the fuel supply passage by using negative pressure in an intake pipe such that the pressure of the gas fuel increases if the negative pressure in the intake pipe decreases, and the pressure of the gas fuel decreases if the negative pressure in the intake pipe increases;
    wherein the source pressure control means comprises a flow rate control valve which is provided in the fuel supply passage and comprises a valve element for opening and closing a passing hole for the gas fuel, a negative pressure receiving part connected to the valve element, a negative pressure applied chamber defined in a back side of the negative pressure receiving part, and an adjustment spring for urging the valve element in a closing direction, wherein the pressure in the negative pressure applied chamber acts to move the valve element in an opening direction, and a negative pressure supplying passage connects the negative pressure applied chamber of the flow rate control valve to the intake pipe.

4. The gas fuel supply system as defined in claim 3, wherein a throttle valve is provided in the intake pipe for adjusting an amount of intake air, and the negative pressure supplying passage connects the negative pressure applied chamber of the flow rate control valve to a downstream side of the throttle valve in the intake pipe.

5. The gas fuel supply system as defined in claim 4, wherein a regulator for decompressing the pressure of the gas fuel to a predetermined pressure is provided in the fuel supply passage, and the flow rate control valve is provided in a downstream side of the regulator in the fuel supply passage.

* * * * *

UNITED STATES PATENT AND TRADEMARK OFFICE
CERTIFICATE OF CORRECTION

| | | |
|---|---|---|
| PATENT NO. | : 7,191,768 B2 | Page 1 of 1 |
| APPLICATION NO. | : 10/523627 | |
| DATED | : March 20, 2007 | |
| INVENTOR(S) | : Motohisa Tokunaga | |

It is certified that error appears in the above-identified patent and that said Letters Patent is hereby corrected as shown below:

Title Page, (73) Assignee Name, please delete the word "Isuza" and replace with --Isuzu--.

Signed and Sealed this

Twenty-ninth Day of May, 2007

JON W. DUDAS
*Director of the United States Patent and Trademark Office*